(12) United States Patent
Ishii

(10) Patent No.: US 7,033,079 B2
(45) Date of Patent: Apr. 25, 2006

(54) VEHICLE-USE BEARING DEVICE HAVING ROTATION DETECTING DEVICE

(75) Inventor: Tomohiro Ishii, Kashiba (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/213,491

(22) Filed: Aug. 6, 2002

(65) Prior Publication Data

US 2003/0031392 A1 Feb. 13, 2003

(30) Foreign Application Priority Data

Aug. 8, 2001 (JP) .......................... P2001-240860

(51) Int. Cl.
*F16C 41/00* (2006.01)

(52) U.S. Cl. ..................................... 384/448
(58) Field of Classification Search ............... 384/448, 384/537, 544
See application file for complete search history.

(56) References Cited

U.S. PATENT DOCUMENTS

| | | | | |
|---|---|---|---|---|
| 4,960,333 A | * | 10/1990 | Faye et al. | 384/448 |
| 5,388,916 A | * | 2/1995 | Ohtsuki et al. | 384/448 |
| 5,407,213 A | * | 4/1995 | Ouchi et al. | 277/317 |
| 5,567,058 A | * | 10/1996 | Morita et al. | 384/448 |
| 5,986,448 A | * | 11/1999 | Yada et al. | 324/173 |

FOREIGN PATENT DOCUMENTS

| | | |
|---|---|---|
| JP | 11-014645 | 1/1999 |
| JP | 11-183492 | 7/1999 |

\* cited by examiner

*Primary Examiner*—Thomas R. Hannon
(74) *Attorney, Agent, or Firm*—Jordan and Hamburg LLP

(57) ABSTRACT

A bearing device, provided in an inner ring thereof are a first cylindrical portion and a second cylindrical portion which is located in a vehicle inner side with respect to the first cylindrical portion and having a smaller outer diameter, wherein a pulser ring is fixed on the first cylindrical portion, a radial direction inner end side of a magnetic sensor is accommodated in a circumferential groove constituted by the first and second cylindrical portions, and a detecting element of the magnetic sensor faces the pulser ring in an axial direction.

20 Claims, 5 Drawing Sheets

VEHICLE-USE BEARING DEVICE HAVING ROTATION DETECTING DEVICE

FIELD OF THE INVENTION

The present invention relates to a bearing device suitable for use in supporting a wheel on the vehicle body.

BACKGROUND OF THE INVENTION

Such a bearing device has a rolling bearing with a double raceway and a hub wheel. A drive shaft as a rotation shaft for a driving wheel includes a small diameter shaft portion and a large diameter shaft portion. The small diameter shaft portion of the drive shaft is fitted into a central hole of the hub wheel for rotation as a unit therewith while the large diameter shaft portion protrudes from the central hole of the hub wheel to a vehicle inner side. The rolling bearing has an inner ring which is fitted on an outer peripheral surface of the vehicle inner side of the hub wheel. The large diameter shaft portion and the inner ring are adjacent to each other in an axial direction, and their heights in a radial direction are approximately the same.

Such a bearing device is provided with, as a rotation detection device, a pulser ring which rotates with the inner ring as a unit to generate rotation magnetic information and a magnetic sensor having a detection element for detecting the magnetic information from the pulser ring.

The pulser ring is arranged on the outer peripheral surface of the vehicle inner side in a narrow annular space between the inner ring and the outer ring of the rolling bearing, which results in a low radial arrangement height from the outer diameter surface of the inner ring.

Therefore, when the magnetic sensor is positioned on an outer diameter surface of the large diameter shaft portion of the drive shaft to face the pulser ring in the axial direction, the radial arrangement height thereof becomes low corresponding to the low radial arrangement height of the pulser ring.

For a magnetic sensor having the whole detecting element covered with a molded resin, when the detecting element is arranged in a predetermined positional relationship with respect to the pulser ring, an inner peripheral side of the mold resin interferes with the large diameter shaft portion of the drive shaft in some cases. Such interference is not preferable.

SUMMARY OF THE INVENTION

Therefore, a main object of the present invention is to provide a bearing device wherein a magnetic sensor having a structure of a detecting element being covered with a molded resin can be arranged with a pulser ring in an axial direction with no interference with a rotation shaft.

Other objects, features, and advantages of the present invention will be apparent from the following description.

The present invention may be summarized as follows.

A bearing device according to the present invention comprises an outer ring member, an inner ring member concentric with the outer ring member and a pulser ring generating an electrical signal in response to a rotation of the inner ring member. The inner ring member has a first cylindrical portion having an outer peripheral surface on which the pulser ring is fixed and a second cylindrical portion located in a vehicle inner side of the first cylindrical portion and having a smaller outer diameter than that of the first cylindrical portion so as to form a circumferential groove together with the first cylindrical portion for accommodating a radial inner end portion of a magnetic sensor.

In the above-described case, since the radial inner end of the magnetic sensor is arranged in the circumferential groove formed by a difference in level between the first cylindrical portion and the second cylindrical portion of the inner ring member, the detecting element of the magnetic sensor can face the pulser ring in the axial direction. Thus, the structure of the present invention is different from a conventional one in which a magnetic sensor is arranged on a shoulder part of a stepped portion of a rotation shaft. Therefore a large diameter portion of the rotation shaft does not interfere with the magnetic sensor. Further, since the radial inner end side of the magnetic sensor can be accommodated in the circumferential groove, the radial dimension of the bearing device can be reduced to contribute to a downsizing.

Preferably, the magnetic sensor includes a detecting element and a covering member which covers the periphery of the detecting element. A radial inner end side of the covering member is accommodated in the circumferential groove constituted by both the first cylindrical portion and the second cylindrical portion so that the detecting element faces the pulser ring in an axial direction.

More preferably, the covering member is a molded resin.

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DETAILED DESCRIPTION OF PREFERRED EMBODIMENTS

Figure 1:
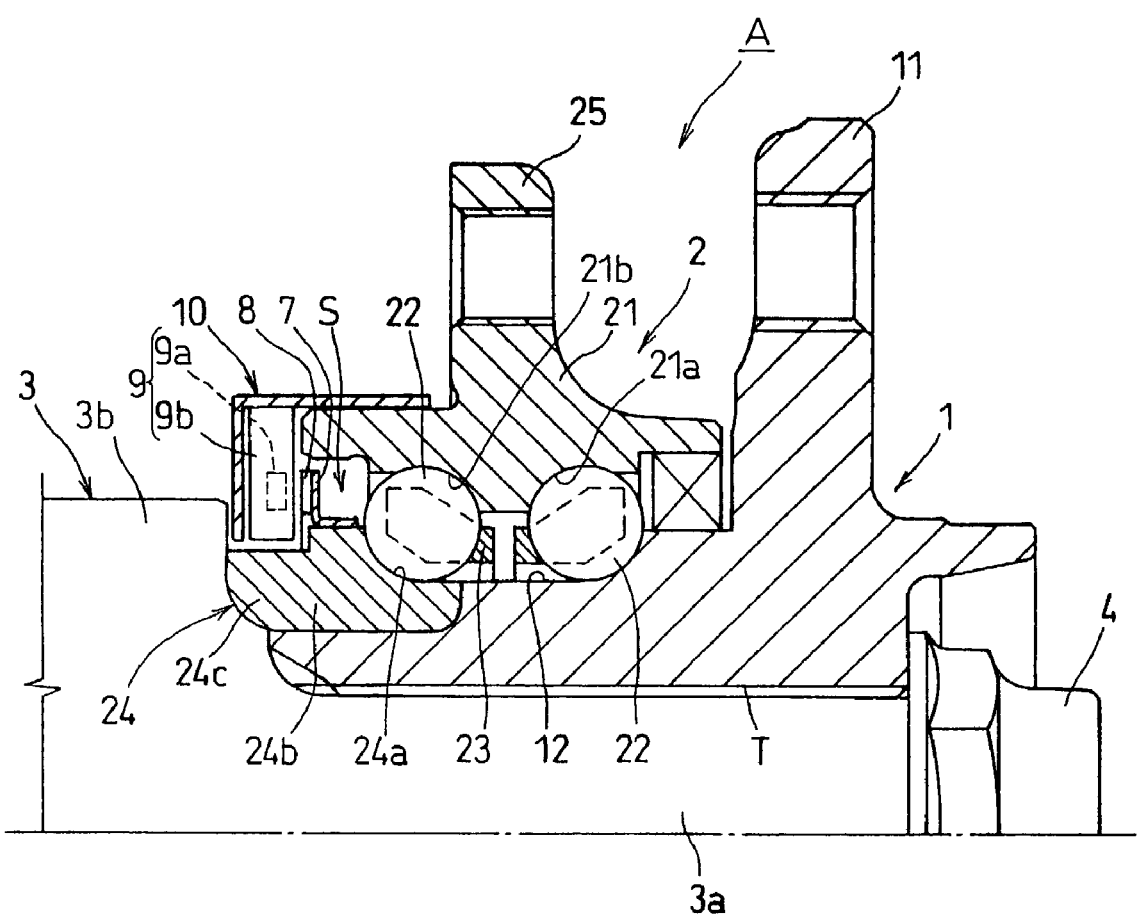
FIG. 1 is a side view in partial longitudinal section showing a bearing device according to a preferred embodiment of the present invention.
Figure 2:
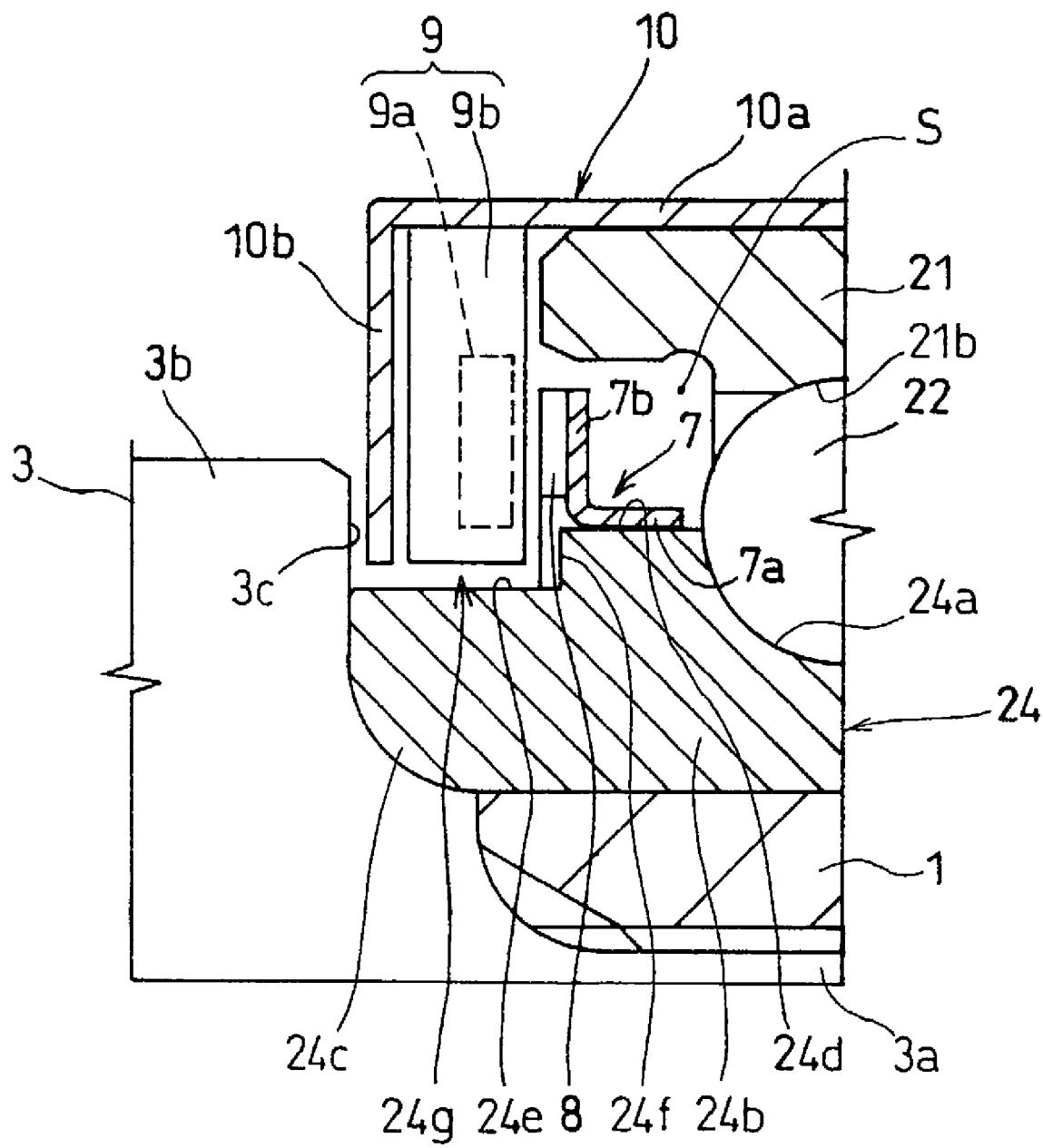
FIG. 2 is an enlarged view of a main portion of FIG. 1.

Referring to FIG. 1 and FIG. 2, a vehicle-use bearing device A according to a preferred embodiment of the present invention comprises a hub wheel 1 having an axial hollow hole T and a rolling bearing with a double raceway 2 mounted on an outer peripheral surface of the hub wheel 1.

The hub wheel 1 has a radially-outward flange 11 facing an outer peripheral surface of a vehicle outer side thereof. A spline is formed in a required region on an inner peripheral surface of the hollow hole T. A raceway groove 12 for vehicle outer side balls (rolling elements) 22 of the rolling bearing 2 is formed on an outer peripheral surface of the hub wheel 1 in a vehicle inner side with respect the flange 11.

The rolling bearing 2 is an angular type rolling ball bearing with a double raceway and is provided with a single outer ring 21 on the inner peripheral surface as an outer ring member having raceway grooves 21a, 21b of double rows in the axial direction, a plurality of balls 22 arranged on the vehicle outer side and the vehicle inner side in double rows in the axial direction, two crown-shaped retainers 23 in the axial direction. The rolling bearing 2 is also composed of an inner ring 24 having a raceway groove 24a on which the vehicle inner side balls 22 roll. The inner ring 24 constitutes one inner ring member while the hub wheel 1 constitutes the other inner ring member.

A drive shaft 3 as a rotation shaft is spline-fitted into the hollow hole T of the hub wheel 1. The vehicle outer side end portion of the drive shaft 3 is fastened by a nut 4 so that the drive shaft 3 is fixed on the hub wheel 1.

The inner ring 24 has a first cylindrical portion 24b which faces the vehicle inner side end portion of the outer ring 21 in the radial direction in the vehicle inner side with respect to the raceway groove 24a. The inner ring 24 also has, in the vehicle inner side of the first cylindrical portion 24b, a second cylindrical portion 24c which projects toward the vehicle inner side direction with respect to the vehicle inner side end portion of the outer ring 21 and which has a smaller outer diameter than that of the first cylindrical portion 24b.

With the above-described structure, the first cylindrical portion 24b has a facing surface 24d forming an annular space S together with the inner peripheral surface of the outer ring 21. The second cylindrical portion 24c has a small diameter surface 24e whose outer diameter is smaller than that of the facing surface 24c. Thus the facing surface 24d and the small diameter surface 24e are formed sequentially in the axial direction in the first cylindrical portion 24a and the second cylindrical portion 24c of the inner ring 24, respectively. Thereby a circumferential groove 24g is formed by a stepped wall surface 24f between the facing surface 24d and the small diameter surface 24e.

The drive shaft 3 is provided sequentially in the axial direction with a small diameter portion 3a which is spline-fitted into the hollow hole T and a large diameter portion 3b whose outer diameter is larger than that of the small diameter portion 3a, and the portion existing in the boundary between the large diameter portion 3b and the small diameter portion 3a has a structure having a stepped wall surface 3c along the radial direction.

The stepped wall surface 3c abuts the vehicle inner side end portion of the second cylindrical portion 24c of the inner ring 24 in a state where the bearing device is attached to the drive shaft 3. Thus, the circumferential groove 24g is surrounded by the stepped wall surface 24f of the vehicle outer side, the stepped wall surface 3c of the vehicle inner side, and the small diameter surface 24e between those stepped wall surfaces 24f and 3c.

The annular space S is partitioned into inside and outside in the axial direction by a metal ring 7 an upper half of which has a cross-sectional shape in the form of an L-shape. The metal ring 7 is fixedly fitted on the facing surface 24d of the first cylindrical portion 24b of the inner ring 24. The metal ring 7 is provided with a cylindrical portion 7a extending along the axial direction and an annular portion 7b extending outward along the radial direction from one axial direction end of the cylindrical portion 7a. An annular plate-like pulser ring 8 in which a direction of a magnetic pole is alternately changed for each predetermined phase is fixed on the annular portion 7b as a unit. The pulser ring 8 is adapted to generate magnetism as an electrical signal in response to a rotation of the inner ring 24.

A magnetic sensor 9 arranged to face the pulser ring 8 in the axial direction is attached to a cover 10 provided on the outer ring 21 so as to cover the annular space S.

The cover 10 is fixedly fitted on the outer peripheral portion of the outer ring 21. The cover 10 is composed of a cylindrical portion 10a and an annular portion 10b extending inward in the radial direction from the vehicle inner side end portion of the cylindrical portion 10a to a position near the outer peripheral surface 24e of the second cylindrical portion 24c. The inner peripheral side of the annular portion 10b of the cover 10 is located inside the circumferential groove 24g. Thus, it is possible that the inner peripheral side of the magnetic sensor 9 is not located on the stepped wall surface 3c of the large diameter portion 3b of the drive shaft 3 and may be located inward in a radial direction with respect to the pulser ring 8.

Such magnetic sensor 9 is comprised of a detecting element 9a detecting magnetism generated from the pulser ring 8 and a covering or sheathing member 9b molded of resin or the like so as to cover the detecting element 9a. In this case the detecting element 9a is arranged on the inner peripheral side end portion of the covering member 9b. In a state where the detecting element 9a and the pulser ring 8 are arranged while properly facing each other in the axial direction, a portion of the magnetic sensor 9 which extends toward a center side of the hub wheel 1 in the radial direction is in a state of approaching the outer peripheral surface 24e of the second cylindrical portion 24c of the inner ring 24.

That is, the portion of the magnetic sensor 9 extending toward the center side in the radial direction is in a state of being more involved inside of the circumferential groove 24g radially inward than the outer periphery of the stepped wall surface 3c of the drive shaft 3 and the fixed portion of the pulser ring 8 in the radial direction.

It is set that the width of the magnetic sensor 9 in the axial direction is smaller than the width of the second cylindrical portion 24c in the axial direction so that the sensor 9 is located within the width of the portion 24c.

The outer diameter of the group of balls 22 in each row in the axial direction is set to a value relatively larger than that in a general case, considering that the interval between the centers of the group of balls 22 in each row is relatively small. That is, setting the diameter of each ball 22 to a large value, is made in order to keep the durability of the balls unchanged while the interval between the centers of the group of balls 22 in each row is set to a narrow one in order that the width of the rolling bearing with a double raceway 2 in the axial direction does not become large by providing the second cylindrical portion 24c.

The contact angle in the angular ball bearing is set to 35 through 40 degrees, and with this also a pressure cone apex interval between balls is set to as a larger value as possible so as to improve the durability.

A disk rotor and a wheel of a disk brake device which is not shown are provided for the flange 11 of the hub wheel 1 and are attached by a plurality of bolts. A flange 25 protruded outwardly in the radial direction on the outer ring 21 of the rolling bearing with a double raceway 2 is fixed by bolts on a knuckle or the like in the vehicle body side not shown.

The flange 25 is provided in a state where the flange is located approximately at the center of the group of double raceway balls 22 in the axial direction. Thus, since the force affecting each row of balls 22 through the outer ring 21 is distributed to both rows approximately equally, its support strength is greater, compared with one located inclining toward one side.

While a distance between centers of both rows 22 is set to a small value so that a width of the bearing device of the present invention is set at approximately the same as that of a conventional device in the axial direction, since the durability is improved by enlarging the diameter of each ball 22 and the contact angle and the like, the bearing device of the present invention can be provided without becoming large in size as in a conventional device.

Although one in which the magnetic sensor 9 is provided via the cover 10 is shown, a member exclusively used for providing the magnetic sensor 9 on the outer ring 21 may be used.

Figure 3:
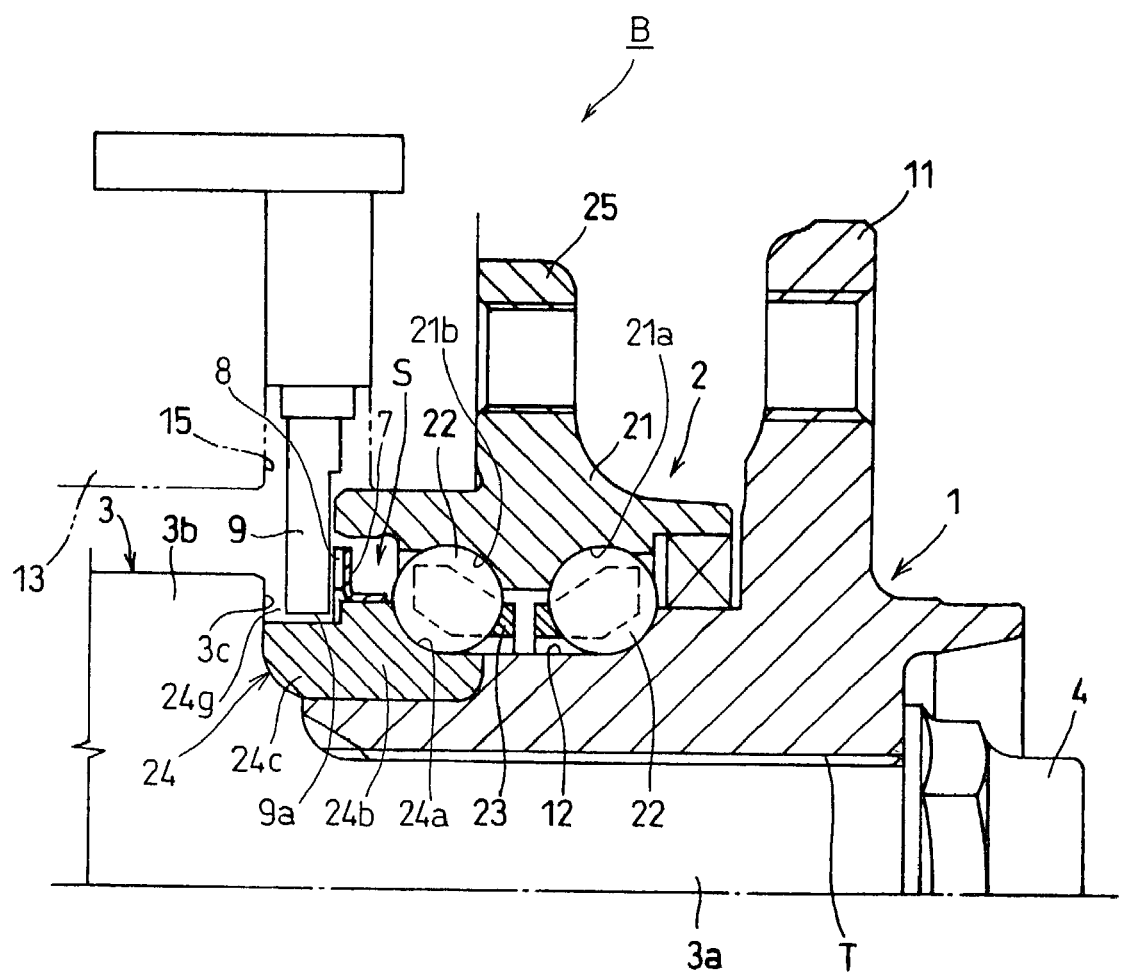
FIG. 3 is a side view in partial longitudinal section showing a bearing device according to another preferred embodiment of the present invention.
Figure 4:
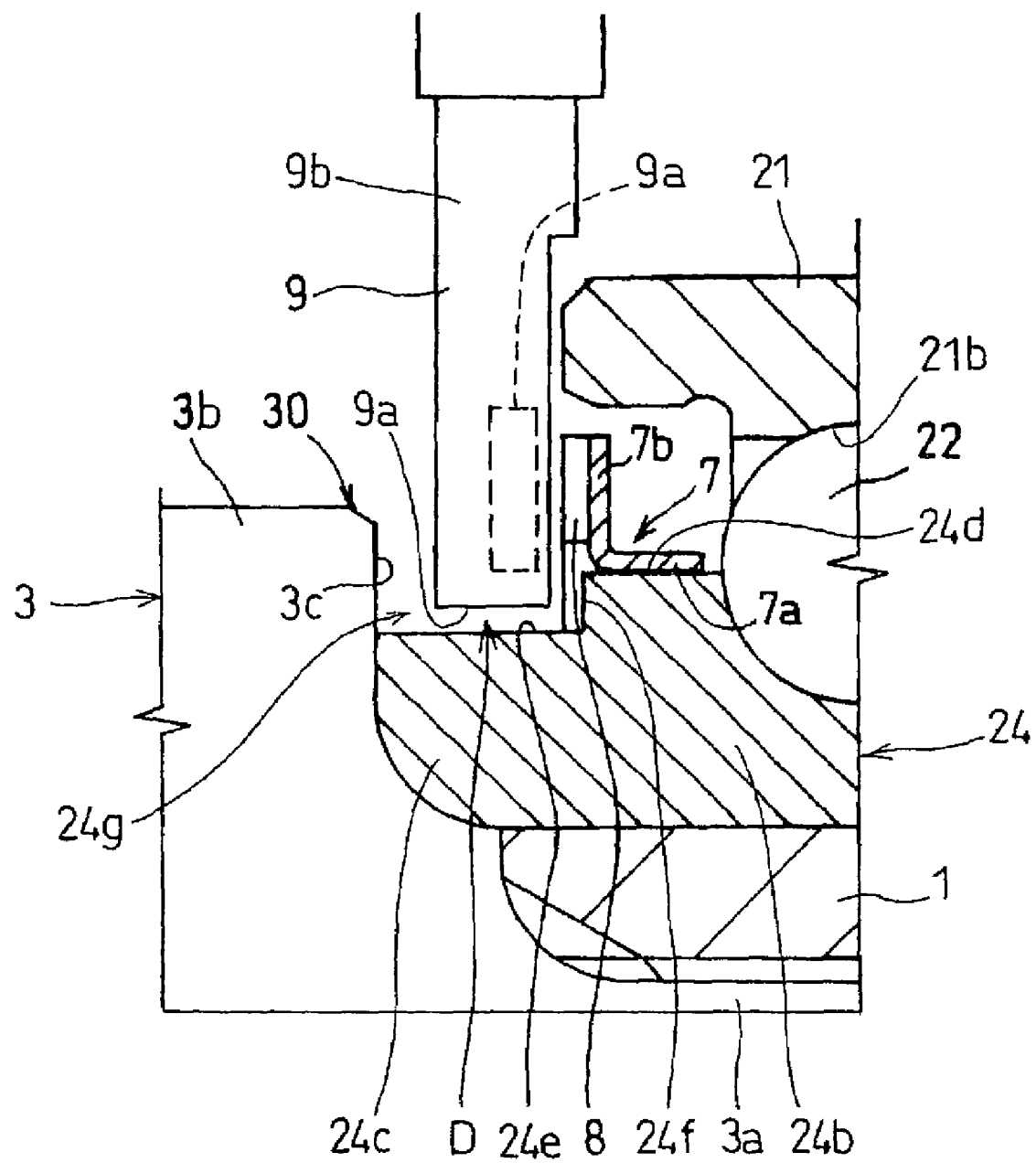
FIG. 4 is an enlarged view of a main portion of FIG. 3.

A bearing device B according to another preferred embodiment of the present invention is explained referring to FIGS. 3 and 4. A knuckle 13 that is a member in the vehicle body side is coupled with the flange 25 of the outer ring 21 by bolts. The magnetic sensor 9 is fixed on the knuckle 13 in the vehicle inner side of the rolling bearing with a double raceway 2.

The outer end side of the magnetic sensor 9 in the radial direction thereof is embedded in the knuckle 13, and the inner peripheral side end surface 9a thereof is protruded toward the bearing device, B through a through hole 15 formed in the knuckle 13. The inner peripheral side end surface 9a of the magnetic sensor 9 is inclined rather toward the inner peripheral side than a position where the pulser ring 8 is disposed so that the magnetic sensor 9 is located in the circumferential groove 24g.

Since the whole magnetic sensor 9 is located rather in the vehicle outer side in the axial direction than an abutting portion where the drive shaft 3 abuts the second cylindrical portion 24c of the inner ring 24 so that the magnetic sensor 9 faces the pulser ring 8, the magnetic sensor 9 does not interfere with the drive shaft 3.

Figure 5:
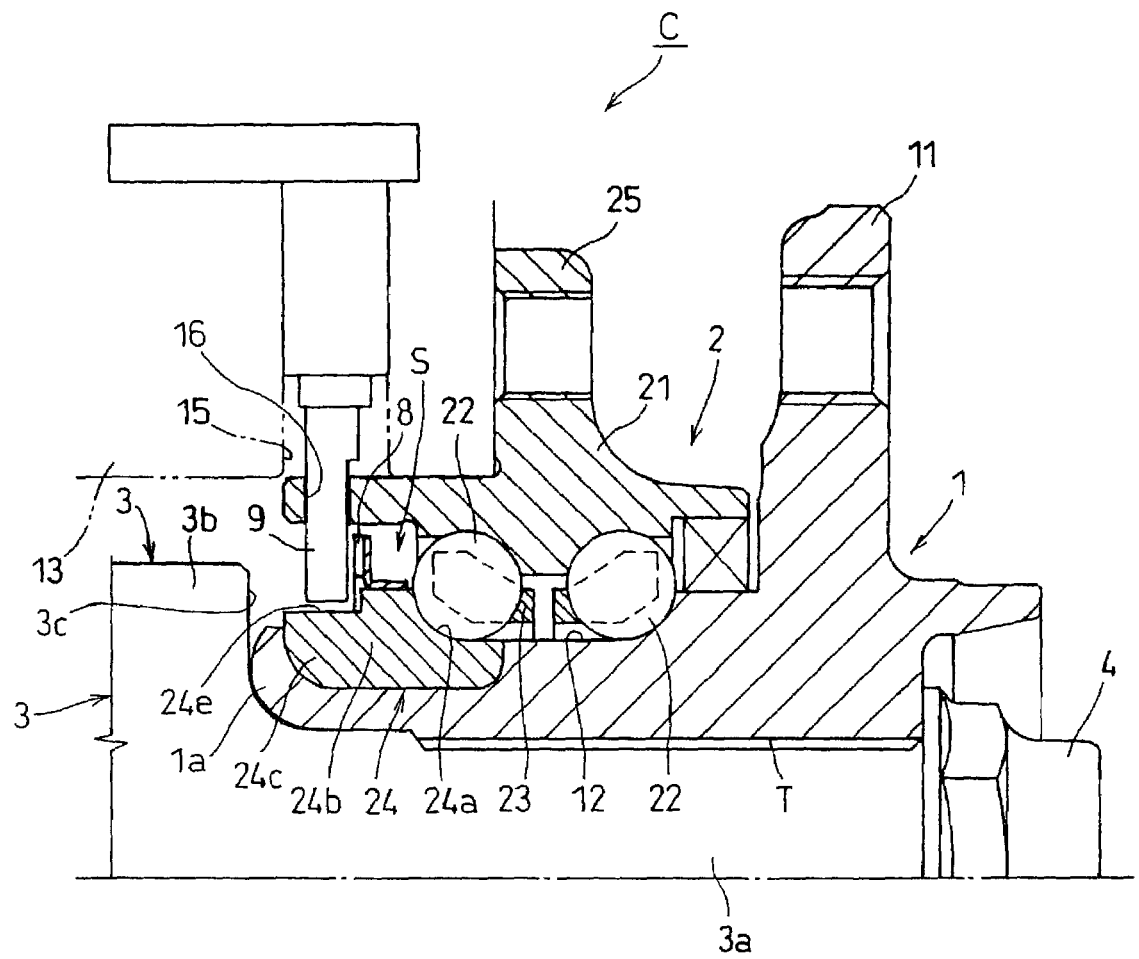
FIG. 5 is a side view in partial longitudinal section showing a bearing device according to still another preferred embodiment of the present invention.

A bearing device C according to still another preferred embodiment of the present invention is explained referring to FIG. 5. In this bearing device C, the inner ring 24 is caulked through plastic deformation where the diameter of the vehicle inner side end portion of the hub wheel 1 is enlarged in advance so that a caulking portion 1a is formed.

When the drive shaft 3 is inserted into the hollow hole T of the hub wheel 1, the stepped wall surface 3c of the drive shaft 3 abuts the caulking portion 1a. As a result, the caulking portion 1a regulates the positions of the bearing device C and the drive shaft 3 in the axial direction. The second cylindrical portion 24c of the inner ring 24 also functions as a buffering portion absorbing a stress of the caulking.

A position of the vehicle inner side end portion of the inner ring 24 and a position of the vehicle inner side end portion of the outer ring 21 are set approximately in the same manner in the axial direction, the magnetic sensor 9 is inserted into the annular space S through a through hole 16 formed in the outer ring 21, and the inner end side of the magnetic sensor 9 in the radial direction is extended up to a position close to the second cylindrical portion 24c of the inner ring 24. Thus, the vehicle inner side end portion of the inner ring 24 is not projected to the vehicle inner side beyond the vehicle inner side end portion of the outer ring 21.

The drive shaft 3 may not be directly fitted into the hub wheel 1 and may be once connected with a constant velocity joint which is not shown so that the constant velocity joint is fitted into and coupled with the hub wheel 1. The shaft body of the constant velocity joint in this case corresponds to the rotation shaft.

The bearing device may be provided with two inner rings in the axial direction having raceway grooves for balls 22, 22 in both rows.

The vehicle inner side end surface of the outer ring 21 and the vehicle inner side end surface of the inner ring 24 may be constructed so that they are located at substantially the same positions in the axial direction.

When in a structure in which rotation information of the inner ring 24 can be outputted as a pulse signal as in the pulser ring 8 and the magnetic sensor 9, various structures such as one in which, for example, the pulser ring 8 is constructed in such a way that recesses and protrusions are alternately formed in the circumferential direction and the condition of the recesses and protrusions is detected by a proximity sensor can be adopted.

While there has been described what is at present considered to be preferred embodiments of this invention, it will be understood that various modifications maybe made therein, and it is intended to cover in the appended claims all such modifications as fall within the true spirit and scope of this invention.

What is claimed is:

1. A bearing device comprising:
    an outer ring member;
    an inner ring member concentric with said outer ring member;
    a magnetic sensor disposed stationary relative said outer ring member; and
    a pulser ring for generating an electrical signal in the magnetic sensor in response to a rotation of said inner ring member;
    wherein
    said inner ring member has a first cylindrical portion having an outer peripheral surface on which said pulser ring is fixed and a second cylindrical portion located on a vehicle inner side with respect to said first cylindrical portion and having a smaller outer diameter than that of said first cylindrical portion;

said magnetic sensor is disposed so as to oppose the outer peripheral surface of said second cylindrical portion; and an axial length of said magnetic sensor is smaller than that of said second cylindrical portion.

2. A bearing device according to claim 1, wherein:

said inner ring member has a smaller outer diameter surface which serves as an outer peripheral surface of said second cylindrical portion;

an inner diameter surface of said magnetic sensor and inner end portion of said sensor are accommodated in a circumferential recess formed of said smaller outer diameter surface;

a step surface between said smaller outer diameter surface and a greater outer diameter surface which serves as said outer peripheral surface of said first cylindrical portion so that an inner diameter surface of said magnetic sensor and said smaller outer diameter surface oppose each other.

3. A bearing device according to claim 1, further comprising:

a cover covering an annular space between said outer ring member and said inner ring member and having a cylindrical portion and annular portion, wherein:

one end of said cylindrical portion is attached to said outer ring member outer peripheral surface, and said annular portion covers said magnetic sensors.

4. A bearing device according to claim 1, wherein:

said magnetic sensor comprises a detecting element for detecting a magnetic of said pulser ring; and said bearing device further comprising an exterior portion;

said detecting element and said exterior portion being integrally molded with a resin; and said detecting element being disposed on the inner end portion.

5. A bearing device according to claim 4, wherein said pulser ring provided on the outer peripheral surface of said first cylindrical portion and said detecting element of said magnetic sensor are provided so as to oppose each other.

6. A bearing device comprising:

an outer ring member;

an inner ring member concentric with said outer ring member;

a shaft portion adjacent to said inner ring;

a magnetic sensor disposed stationary relative said outer ring member; and a pulser ring for generating an electrical signal in the magnetic sensor in response to a rotation of said inner ring member;

wherein said inner ring member has a first cylindrical portion having an outer peripheral surface on which said pulser ring is fixed and a second cylindrical portion located on a vehicle inner side with respect to said first cylindrical portion and having a smaller outer diameter than that of said first cylindrical portion;

said magnetic sensor is disposed so as to oppose an outer peripheral surface of said second cylindrical portion; and said shaft portion has a greater outer diameter than that of said second cylindrical portion in which in a recess formed between said shaft portion and an outer peripheral surface of said first and second cylindrical portions, an inner peripheral surface of said magnetic sensor and an inner diameter end portion of said sensor are accommodated.

7. A bearing device according to claim 6, wherein:

said magnetic sensor comprises a detecting element for detecting a magnetism of said pulser ring; and said bearing device further comprising an exterior portion;

said detecting element and said exterior portion being integrally molded with a resin; and said detecting element being disposed on the inner end portion.

8. A bearing device according to claim 6, wherein said pulser ring provided on the outer peripheral surface of said first cylindrical portion and a detecting element of said magnetic sensor are provided so as to oppose each other.

9. A bearing device comprising:

an outer ring member provided with a flange;

a knuckle connected with a bolt to said outer ring member flange;

an inner ring member concentric with said outer ring member;

a shaft portion adjacent to said inner ring;

a magnetic sensor disposed stationary relative said outer ring member; and a pulser ring for generating an electrical signal in the magnetic sensor in response to a rotation of said inner ring member;

wherein said inner ring member has a first cylindrical portion having an outer peripheral surface on which said pulser ring is fixed and a second cylindrical portion located on a vehicle inner side with respect to said first cylindrical portion and having a smaller outer diameter than that of said first cylindrical portion;

said magnetic sensor is disposed so as to oppose an outer peripheral surface of said first cylindrical portion;

said shaft portion has a greater outer diameter than that said second cylindrical portion in which in a recess formed between said shaft portion and an outer peripheral surface of said first and second cylindrical portions, an inner peripheral surface of said magnetic sensor and an inner diameter end portion of said sensor extending to pass through said knuckle are accommodated.

10. A bearing device according to claim 9, wherein:

said magnetic sensor comprises a detecting element for detecting a magnetism of said pulser ring; and said bearing device further comprising an exterior portion;

said detecting element and said exterior portion being integrally molded with a resin; and said detecting element being disposed on the inner end portion.

11. A bearing device according to claim 9, wherein said pulser ring provided on the outer peripheral surface of said first cylindrical portion and a detecting element of said magnetic sensor are provided so as to oppose each other.

12. A bearing device according to claim 9, wherein said sensor further passes through the outer ring.

13. A bearing device according to claim 12, wherein:

said magnetic sensor comprises a detecting element for detecting a magnetism of said pulser ring; and said bearing device further comprising an exterior portion;

said detecting element and said exterior portion being integrally molded with a resin; and said detecting element being disposed on the inner end portion.

14. A bearing device according to claim 12, wherein said pulser ring provided on the outer peripheral surface of said first cylindrical portion and a detecting element of said magnetic sensor are provided so as to oppose each other.

15. A bearing device comprising:

an outer ring member provided with a flange;

a knuckle connected with a bolt to said outer ring member flange;

an inner ring member concentric with said outer ring member;

a magnetic sensor disposed stationary relative said outer ring member; and a pulser ring for generating an electrical signal in the magnetic sensor in response to a rotation of said inner ring member;

wherein said inner ring member has a first cylindrical portion having an outer peripheral surface on which said pulser ring is fixed and a second cylindrical portion located on a vehicle inner side with respect to said first cylindrical portion and having a smaller outer diameter than that of said first cylindrical portion;

said magnetic sensor is disposed so as to oppose an outer peripheral surface of said first cylindrical portion;

a circumferential recess formed between said shaft portion and the outer peripheral surface of said first and second cylindrical portions, an inner peripheral surface of said magnetic sensor and an inner diameter end portion of said sensor extending to pass through said knuckle are accommodated, and the axial length of said magnetic sensor is smaller than that of said second cylindrical portion.

16. A bearing device according to claim 15, wherein:

said magnetic sensor comprises a detecting element for detecting a magnetism of said pulser ring; and said bearing device further comprising an exterior portion;

said detecting element and said exterior portion being integrally molded with a resin; and said detecting element being disposed on the inner end portion.

17. A bearing device according to claim 15, wherein said pulser ring provided on the outer peripheral surface of said first cylindrical portion and a detecting element of said magnetic sensor are provided so as to oppose each other.

18. A bearing device according to claim 15, wherein said sensor further passes through the outer ring.

19. A bearing device according to claim 18, wherein:

said magnetic sensor comprises a detecting element for detecting a magnetism of said pulser ring; and said bearing device further comprising an exterior portion;

said detecting element and said exterior portion being integrally molded with a resin; and said detecting element being disposed on the inner end portion.

20. A bearing device according to claim 18, wherein said pulser ring provided on the outer peripheral surface of said first cylindrical portion and a detecting element of said magnetic sensor are provided so as to oppose each other.

* * * * *